United States Patent [19]

Osterloh et al.

[11] 4,316,137
[45] Feb. 16, 1982

[54] COMPLETELY INSULATED, METAL-ENCAPSULATED ELECTRICAL SWITCHING SECTION

[75] Inventors: Manfred Osterloh, Rüsselsheim; Otto Putz, Maintal; Walter Stecker, Heusenstamm, all of Fed. Rep. of Germany

[73] Assignee: Siemens Aktiengesellschaft, Munich, Fed. Rep. of Germany

[21] Appl. No.: 184,477

[22] Filed: Sep. 5, 1980

[30] Foreign Application Priority Data

Sep. 26, 1979 [DE] Fed. Rep. of Germany ....... 2939006

[51] Int. Cl.³ .............................................. H03H 1/00
[52] U.S. Cl. .................................................. 323/364
[58] Field of Search ............... 179/27, 99 R, DIG. 10; 323/333, 355, 359, 364

[56] References Cited

U.S. PATENT DOCUMENTS

| | | | |
|---|---|---|---|
| 2,243,921 | 6/1941 | Rust et al. | 323/364 |
| 3,423,669 | 1/1969 | Holliday | 323/364 X |
| 3,838,334 | 9/1974 | Miller et al. | 323/364 |
| 3,990,001 | 11/1976 | Schiemann | 323/364 X |

FOREIGN PATENT DOCUMENTS

| | | |
|---|---|---|
| 339835 | 4/1920 | Fed. Rep. of Germany . |
| 425628 | 2/1926 | Fed. Rep. of Germany . |
| 1942088 | 9/1970 | Fed. Rep. of Germany . |
| 2245779 | 4/1974 | Fed. Rep. of Germany . |
| 2125297 | 11/1976 | Fed. Rep. of Germany . |

Primary Examiner—William M. Shoop
Attorney, Agent, or Firm—Kenyon & Kenyon

[57] ABSTRACT

The arrangement of the outer electrode of a capacitive voltage transformer designed as a capacitor in a completely insulated, metal-encapsulated electrical switching section is disclosed. The outer electrode comprises a tube which is arranged coaxially in a tubular jacket of the metal encapsulation and is fastened, electrically insulated, to the tubular jacket. The inner electrode of the voltage transformer is a conductor concentrically arranged in the tubular jacket. Between the tube and the tubular jacket, an insulating tube section is arranged. An insulating bushing extends through the wall of the insulating tube section and the wall of the tubular jacket. The insulating bushing is mounted on a metallic bushing. A head screw clamps the insulating tube section between the tube and the tubular jacket, and a flange of the insulating bushing is clamped between the outside of the tubular jacket and a flange of the metallic bushing. A voltage take-off is secured to the metallic bushing.

7 Claims, 1 Drawing Figure

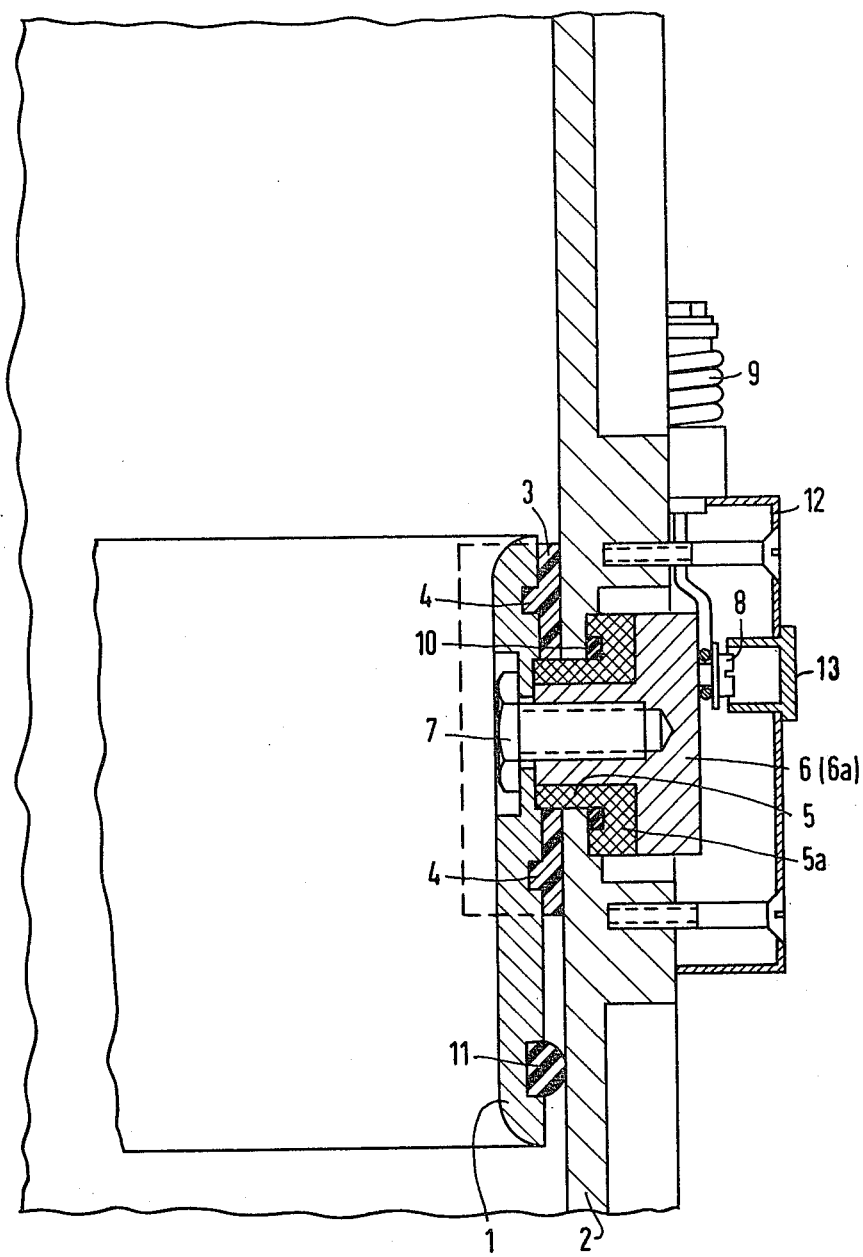

COMPLETELY INSULATED, METAL-ENCAPSULATED ELECTRICAL SWITCHING SECTION

BACKGROUND OF THE INVENTION

The present invention relates to a completely insulated, metal-encapsulated electrical switching section of the type in which a large-area electrode is arranged coaxially in a tubular jacket of the switching section.

DE-OS No. 23 25 438 disclosed a completely insulated, metal-encapsulated electrical switching section in which the large-area electrode is in the form of a tube arranged coaxially in a tubular jacket of the metal encapsulation and is fastened therein electrically insulated therefrom. The large area electrode forms a capacitive voltage transformer with a conductor disposed centrally in the tubular jacket.

OBJECTS AND SUMMARY OF THE INVENTION

It is an object of the present invention to simplify in a completely insulated metal-encapsulated switch section, the fastening of a large-area electrode in the form of a tube in a tubular jacket.

It is another object of the present invention to provide for a simplified voltage take-off in a switching section of the aforementioned type.

More specifically, the invention provides an improvement in a completely insulated, metal-encapsulated electrical switching section which includes disposed therein a tube in the form of a large-area electrode arranged coaxially in a tubular jacket of the metal encapsulation. The tube is fastened electrically insulated to the tubular jacket and the tube in cooperation with a conductor arranged centered in the tubular jacket forms a capacitor of a capacitive voltage transformer. In accordance with the invention, an insulating tube section is disposed between the tube and the tubular jacket and an insulating bushing extends through the wall of the insulating tube section and through the wall of the tubular jacket. A metallic bushing is provided on which the insulating bushing is seated. A screw is received in the metallic bushing for clamping the insulating tube section between the tube and the tubular jacket, the insulating bushing having a flange portion clamped between the outside of the tubular jacket and a flange portion of the metallic bushing. A voltage take-off is connected to the metallic bushing.

The head of the screw is countersunk into the inside of the tube and the metallic bushing includes a blind hole which threadedly engages the shank of the screw. A sealing ring disposed on the underside of the flange portion of the insulating bushing. The blind hole and the sealing ring seal the insulating bushing against the tubular jacket.

In the disclosed embodiment, a centering ring may be disposed in a groove of the tube between the tube and the tubular jacket and two projections may be formed on the inside of the insulating tube section and engaged in recesses of the tube.

Also in the disclosed embodiment, the voltage take-off comprises a terminal screw engaged in the flange portion of the metallic bushing, a cover secured to the tubular jacket which covers the flange portion of the metallic bushing, and a removable flanged bushing is engaged in the cover, the removable flanged bushing and the terminal screw having a common axis.

An insulating tube section is understood herein to be an electrically insulating part, the inner contour of which fits the outer contour of the tube and the outer contour of which fits the inner contour of the tubular jacket of the metal encapsulation. The arrangement provided by the invention has the advantage that no adjustment of the tube is necessary to dispose it in its intended position. By pressing the tube against the insulating tube section and pressing the insulating tube section against the inside of the tubular jacket by means of the head screw, the insulating tube section is aligned at the tubular jacket and the tube is aligned at the insulating tube section. When the screw is tightened, the tube can neither be rotated nor moved in its longitudinal direction or in the axial direction of the screw.

These and other aspects of the present invention will be more apparent from the following description of the preferred embodiments of the invention taken in conjunction with the accompanying drawings and appended claims.

BRIEF DESCRIPTION OF THE DRAWINGS

The present invention is illustrated by way of example and not limitation in the sole figure of the accompanying drawing which is a schematic, side elevation in cross-section of a portion of the switching section according to the invention.

DESCRIPTION OF THE PREFERRED EMBODIMENT

Referring to the drawing, a tube in the form of a large-area electrode is designated 1. The tube 1 is arranged coaxially in a tubular jacket 2 of a metal encapsulation, shown only partially, of a completely insulated electrical switching section, otherwise not shown. The tubular jacket 2 may be filled, as is the rest of the metal encapsulation, with an electronegative gas, for example $SF_6$.

The tube 1 is fastened electrically insulated to the tubular jacket 2. The tube together with a conductor centrally arranged in the tubular jacket 2 which is not shown, forms a capacitor of a capacitive voltage transformer.

An insulating tube section 3 is arranged between the tube 1 and the tubular jacket 2.

In the illustrated embodiment, the insulating tube section 3 has two projections 4 which are engaged in recesses arranged on the back of the tube 1. By means of the projections 4, the insulating tube section 3 can be preassembled with the tube 1.

An insulating bushing 5 extends through the wall of the insulating tube section 3 and also passes through the wall of the tubular jacket 2. The insulating bushing 5 is mounted on a metallic bushing 6 which receives a head screw 7. The insulating tube section 3 is clamped between the tube 1 and the tubular jacket 2 by means of the head screw 7. At the same time the head screw clamps a flange 5 of the insulating bushing 5 between the outside of the tubular jacket 2 and a flange 6a of the metallic bushing 6.

The head of the screw is countersunk into the inside of the tube 1 and engages a blind hole thread of the metallic bushing 6. In this manner the tube 1 is electrically connected to the flange 6a of the metallic bushing 6.

Into the back of the flange 6a of the metallic bushing 6, a terminal screw 8 for a voltage take-off is screwed. By means of the terminal screw 8, an overvoltage arrester 9 can at the same time be connected to the flange 6a, as shown.

The underside of the flange 5a of the insulating bushing 5 is sealed fluid-tight against the tubular jacket 5 by means of a seal 10. A fluid-tight seal is provided between the insulating bushing 5 and the metallic bushing 6, for example, by cementing the bushings together. As a result, electro-negative gas cannot escape along the contact surfaces of the bushings 5 and 6 or along the cylindrical surface of the insulating bushing 5. Electro-negative gas cannot escape along the screw 7, since the screw shank is engaged in a blind hole of the metallic bushing 6.

A centering ring 11 secured in a groove of the tube 1 can be arranged between the tubular jacket 2 and the tube 1.

The flange 6a of the metallic bushing 6 is covered by a cover 12 screwed to the tubular jacket 2. In order to provide access to the terminal screw 8 without removing the cover 12, a removable flanged bushing 13 is inserted into the bottom of the cover 12 at the height of the terminal screw 8.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

What is claimed is:

1. In a completely insulated, metal encapsulated electrical switching section including disposed therein a tube in the form of a large-area electrode arranged coaxially in a tubular jacket of the metal encapsulation, the tube being fastened electrically insulated to the tubular jacket, the tube in cooperation with a conductor arranged centered in the tubular jacket forming a capacitor of a capacitive voltage transformer, the improvement comprising an insulating tube section disposed between the tube and the tubular jacket, an insulating bushing extending through the wall of the insulating tube section and through the wall of the tubular jacket, a metallic bushing on which the insulating bushing is seated, a screw received in the metallic bushing for clamping the insulating tube section between the tube and the tubular jacket, the insulating bushing having a flange portion clamped between the outside of the tubular jacket and a flange portion of the metallic bushing, and a voltage take-off connected to the metallic bushing.

2. The improvement according to claim 1, wherein the head of the screw is countersunk into the inside of the tube and the metallic bushing includes a blind hole which threadedly engages the shank of the screw.

3. The improvement according to claim 1 and including a sealing ring disposed on the underside of the flange portion of the insulating bushing for sealing the insulating bushing against the tubular jacket.

4. The improvement according to claim 1 and comprising a centering ring disposed in a groove of the tube between the tube and the tubular jacket.

5. The improvement according to claim 1, wherein the voltage take-off comprises a terminal screw engaged in the flange portion of the metallic bushing.

6. The improvement according to claim 5 and comprising a cover secured to the tubular jacket and covering the flange portion of the metallic bushing, a removable flange bushing being engaged in the cover, the removable flange bushing and the terminal screw having a common axis.

7. The improvement according to claim 1 and comprising two projections formed on the inside of the insulating tube section and engaged in recesses of the tube.

* * * * *